United States Patent
Xiao et al.

(10) Patent No.: US 12,073,846 B2
(45) Date of Patent: Aug. 27, 2024

(54) SPEECH NOISE REDUCTION PROCESSING METHOD AND APPARATUS, AND COMPUTER DEVICE AND STORAGE MEDIUM

(71) Applicant: ZHUHAI JIELI TECHNOLOGY CO., LTD, Zhuhai (CN)

(72) Inventors: Qiang Xiao, Zhuhai (CN); Quanzhi Xiao, Zhuhai (CN); Rongjun Huang, Zhuhai (CN); Guiping Fang, Zhuhai (CN); Yufeng Yan, Zhuhai (CN)

(73) Assignee: ZHUHAI JIELI TECHNOLOGY CO., LTD, Zhuhai (CN)

( * ) Notice: Subject to any disclaimer, the term of this patent is extended or adjusted under 35 U.S.C. 154(b) by 320 days.

(21) Appl. No.: 17/770,717

(22) PCT Filed: Sep. 30, 2020

(86) PCT No.: PCT/CN2020/119600
§ 371 (c)(1),
(2) Date: Apr. 21, 2022

(87) PCT Pub. No.: WO2021/078010
PCT Pub. Date: Apr. 29, 2021

(65) Prior Publication Data
US 2023/0230608 A1 Jul. 20, 2023

(30) Foreign Application Priority Data

Oct. 21, 2019 (CN) .......................... 201911000052.8

(51) Int. Cl.
*G10L 21/0232* (2013.01)
(52) U.S. Cl.
CPC .............................. *G10L 21/0232* (2013.01)
(58) Field of Classification Search
USPC ...................................................... 704/1–504
See application file for complete search history.

(56) References Cited

U.S. PATENT DOCUMENTS 11,240,311 B2 * 2/2022 Binder ...................... G07C 3/02
2006/0200344 A1 * 9/2006 Kosek ................. G10L 21/0208
704/226

(Continued)

FOREIGN PATENT DOCUMENTS

CN 103021420 A 4/2013
CN 108735213 A 11/2018

(Continued)

OTHER PUBLICATIONS

International Search Report for corresponding Application No. PCT/CN2020/119600 dated Dec. 30, 2020, 5 pages.

(Continued)

*Primary Examiner* — Marcus T Riley
(74) *Attorney, Agent, or Firm* — Taft Stettinius & Hollister LLP

(57) ABSTRACT

A speech noise reduction processing method, an apparatus, a computer device and a storage medium. The method comprises: responsive to a distance between a speech collection device and a target object being detected to reach a preset value, acquiring a noisy speech signal collected by the speech collection device and performing frequency division processing on the noisy speech signal to obtain a low-frequency band signal; acquiring an amplitude spectrum and a phase spectrum of the low-frequency band signal; acquiring a modulation domain signal corresponding to the amplitude spectrum; performing spectral subtraction to obtain a noise-reduced modulation domain amplitude spectrum; compensating the modulation domain phase spectrum to obtain the compensated modulation domain phase spectrum; and obtaining a noise-reduced low-frequency band signal based on the compensated modulation domain phase spectrum, the noise-reduced modulation domain amplitude spec- (Continued)

trum and the phase spectrum of the low-frequency band signal.

20 Claims, 5 Drawing Sheets

(56) References Cited

U.S. PATENT DOCUMENTS

| | | | | |
|---|---|---|---|---|
| 2014/0185827 | A1* | 7/2014 | Kitazawa | H04R 3/005 |
| | | | | 381/94.2 |
| 2018/0366137 | A1* | 12/2018 | Ikeda | G10L 21/0264 |
| 2021/0157312 | A1* | 5/2021 | Cella | G01M 13/045 |
| 2022/0108262 | A1* | 4/2022 | Cella | G06Q 10/063118 |
| 2023/0230608 | A1* | 7/2023 | Xiao | G10L 21/0232 |
| | | | | 704/200 |

FOREIGN PATENT DOCUMENTS

| | | | | | |
|---|---|---|---|---|---|
| CN | 108831500 | A | | 11/2018 | |
| CN | 110267163 | A | | 9/2019 | |
| CN | 110797041 | A | * | 2/2020 | ......... G10L 21/0208 |
| CN | 114207715 | A | * | 3/2022 | ............... G01S 5/18 |
| CN | 110797041 | B | * | 5/2023 | ......... G10L 21/0208 |
| JP | 2006047639 | A | | 2/2006 | |
| JP | 2020203075 | A | * | 12/2020 | .............. G01P 15/18 |
| WO | WO-2021078010 | A1 | * | 4/2021 | ......... G10L 21/0208 |

OTHER PUBLICATIONS

Written Opinion for corresponding Application No. PCT/CN2020/119600 dated Dec. 30, 2020, 5 pages.

\* cited by examiner

US 12,073,846 B2

SPEECH NOISE REDUCTION PROCESSING METHOD AND APPARATUS, AND COMPUTER DEVICE AND STORAGE MEDIUM

CROSS REFERENCE TO RELATED APPLICATIONS

This is a U.S. National Stage application of, and claims priority to, PCT/CN2020/119600, filed Sep. 30, 2020, which further claims priority to Chinese Patent Application No. 201911000052.8, filed Oct. 21, 2019, the disclosures of which are incorporated herein by reference in their entirety.

TECHNICAL FIELD

The present disclosure relates to the speech noise reduction technology, and in particular to a speech noise reduction processing method, an apparatus, a computer device and a storage medium.

BACKGROUND

Noises have a great impact on speech acoustic analysis and features. Various noises produce various clutters in the speech spectrum, resulting in inaccurate recognition and analysis of the acoustic features. In a speed transmission system, noises may mask the speed and affect clearly hearing of the speed content. Excessive noises may reduce the speed recognition rate. For the noise interference, it is necessary to perform speech noise reduction processing to reduce the impact of noises on speech and highlight the speech features.

During the implementation process, the inventors noted that at least the following defects existed in the related art that too much speed information may be eliminated in traditional methods.

SUMMARY

In view of the foregoing, it is necessary to provide a speech noise reduction processing method, an apparatus, a computer device and a storage medium that are capable to avoid excessive elimination of speech information, so as to solve the above technical problems.

In order to achieve the above object, some embodiments of the present disclosure provide a method for processing speech noise reduction, including:

responsive to a distance between speech collection devices reaching a preset value, acquiring a noisy speech signal collected by each respective speech collection device, and performing frequency division processing on the noisy speech signal to obtain a low-frequency band signal;

acquiring an amplitude spectrum and a phase spectrum of the low-frequency band signal;

acquiring a modulation domain signal corresponding to the amplitude spectrum; the modulation domain signal including a modulation domain amplitude spectrum, a modulation domain power spectrum and a modulation domain phase spectrum;

performing spectral subtraction to process the modulation domain amplitude spectrum or the modulation domain power spectrum, to obtain a noise-reduced modulation domain amplitude spectrum; a smoothing over-subtraction factor in the spectral subtraction being obtained according to a posterior signal-to-noise ratio of the modulation domain and a smoothing factor;

compensating the modulation domain phase spectrum to obtain a compensated modulation domain phase spectrum;

obtaining a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

In an embodiment, the method further includes:

performing frequency division on the noisy speech signal, to obtain a high-frequency band signal;

acquiring an amplitude spectrum and a phase spectrum of the high-frequency band signal;

using a transfer gain function to process a amplitude spectrum of the high-frequency band signal, to obtain the amplitude spectrum of the noise-reduced high-frequency band signal; obtaining a noise-reduced high-frequency band signal based on the amplitude spectrum of the noise-reduced high-frequency band signal and the phase spectrum of the high-frequency band signal; the transfer gain function is obtained according to the power spectrum, a cross-power spectrum of the high-frequency band signal, and an estimated noise cross-power spectrum.

synthesizing the noise-reduced high-frequency band signal and the noise-reduced low-frequency band signal, to obtain a noise-reduced speech signal.

In an embodiment, in the performing spectral subtraction to process the modulation domain amplitude spectrum or the modulation domain power spectrum to obtain a noise-reduced modulation domain amplitude spectrum, the noise-reduced modulation domain amplitude spectrum is obtained based on the following formula:

$$|S(u,w,k)|^p = \begin{cases} |Y_{LF}(u,w,k)|^p - \alpha(k)|V(u,w,k)|^p, & |Y_{LF}(u,w,k)|^p \geq \alpha(k)|V(u,w,k)|^p \\ \beta|V(u,w,k)|^p, & \text{others} \end{cases} ;$$

$$\alpha(k) = \theta\alpha(k-1) + (1-\theta)\left(\alpha_0 - \frac{4}{15}SNR_{post}(u,w,k)\right).$$

wherein, u is a modulation frame variable; w is a discrete frequency variable; k is a modulation domain variable; |S(u, w, k)| is the noise-reduced modulation domain amplitude spectrum; p is a type of the spectral subtraction, p=1 indicates that a spectral subtraction of the modulation domain amplitude spectrum is adopted, while p=2 indicates that a spectral subtraction of the modulation domain power spectrum is adopted; if p=|V(u, w, k)|$^p$ is the estimated noise modulation domain amplitude spectrum, if p=$^2$, |V(u, w, k)|$^p$ is an estimated noise modulation domain power spectrum; $\alpha(k)$ is the modulation domain smoothing over-subtraction factor; |Y$_{LF}$(u, w, k)|$^p$ is the modulation domain amplitude spectrum or modulation domain power spectrum; SNR$_{post}$(u, w, k) is a posterior signal-to-noise ratio of the modulation domain; $\theta$ is a smoothing factor; $\alpha_0$ is a constant.

In an embodiment, the compensating the modulation domain phase spectrum to obtain a compensated modulation domain phase spectrum includes:

performing conjugate angle modulation on the modulation domain phase spectrum by using an antisymmetric function and the estimated noise modulation domain amplitude spectrum, to obtain a phase compensation; or, performing conjugate angle modulation on the modulation domain phase spectrum by using the antisymmetric function and the estimated noise modulation domain power spectrum, to obtain a phase compensation;

obtaining a compensated modulation domain phase spectrum according to the phase compensation and the modulation domain phase spectrum.

In an embodiment, in the performing conjugate angle modulation on the modulation domain phase spectrum by using the antisymmetric function and the estimated noise modulation domain amplitude spectrum, to obtain a phase compensation, the phase compensation is obtained based on the following formula:

$$\Lambda(u, w, k) = \xi \varphi(k) |V(u, w, k)|^1;$$

wherein, u is the modulation frame variable; W is the discrete frequency variable; k is the modulation domain variable; $\Lambda(u, w, k)$ is the phase compensation; $\varphi(k)$ is the antisymmetric function; $\xi$ is a constant; $|V(u, w, k)|^1$ is the estimated noise modulation domain amplitude spectrum;

in the performing conjugate angle modulation on the modulation domain phase spectrum by using the antisymmetric function and the estimated noise modulation domain power spectrum, to obtain a phase compensation, the phase compensation is obtained based on the following formula:

$$\Lambda(u, w, k) = \xi \varphi(k) |V(u, w, k)|^2;$$

wherein, u is the modulation frame variable; w is the discrete frequency variable; k is the modulation domain variable; $\Lambda(u, w, k)$ is the phase compensation, $\varphi(k)$ is the antisymmetric function; $\xi$ is a constant; $|V(u, w, k)|^2$ is the estimated noise modulation domain power spectrum;

In the obtaining the compensated modulation domain phase spectrum according to the phase compensation and the modulation domain phase spectrum, the compensated phase spectrum is obtained based on the following formula:

$$\text{angle}[S(u, w, k)] = \text{angle}[Y_{LF}(u, w, k)] + \Lambda(u, w, k);$$

wherein, $\text{angle}[S(u, w, k)]$ is the compensated phase spectrum; $\text{angle}[Y_{LF}(u, w, k)]$ is the modulation domain phase spectrum.

In the obtaining the compensated modulation domain phase spectrum according to the phase compensation and the modulation domain phase spectrum, the compensated phase spectrum is obtained based on the following formula:

$$\text{angle}[S(u, w, k)] = \text{angle}[Y_{LF}(u, w, k)] + \Lambda(u, w, k);$$

wherein, $\text{angle}[S(u, w, k)]$ is the compensated phase spectrum; $\text{angle}[Y_{LF}(u, w, k)]$ is the modulation domain phase spectrum.

In an embodiment, the obtaining the noise-reduced low-frequency band signal based on the compensated modulation domain phase spectrum, the noise-reduced modulation domain amplitude spectrum and the phase spectrum of the low-frequency band signal includes:

performing inverse-Fourier transformation and overlap-add processing successively on the noise-reduced modulation domain amplitude spectrum and the compensated phase spectrum, to obtain the amplitude spectrum of the noise-reduced low-frequency band signal;

performing inverse-Fourier transformation and overlap-add processing successively on the amplitude spectrum of the noise-reduced low-frequency band signal and the phase spectrum of the low-frequency band signal, to obtain the noise-reduced low-frequency band signal.

In an embodiment, the obtaining the noise-reduced high-frequency band signal based on the amplitude spectrum of the noise-reduced high-frequency band signal and the phase spectrum of the high-frequency band signal includes:

performing inverse-Fourier transformation and overlap-add processing on the amplitude spectrum of the high-frequency band signal and the amplitude spectrum of the noise-reduced high-frequency band signal, to obtain the noise-reduced low-frequency band signal.

In an embodiment, in the using the transfer gain function to process the amplitude spectrum of the high-frequency band signal, to obtain the amplitude spectrum of the noise-reduced high-frequency band signal, the amplitude spectrum of the noise-reduced high-frequency band signal is obtained based on the following formula:

$$|S(u, w)| = |Y_{HF}(u, w)| H(u, w);$$

$$H(u, w) = \frac{|P_{Y_i Y_j}(u, w)| - |P_{V_i V_j}(u, w)|}{\sqrt{P_{Y_i Y_i}(u, w) P_{Y_j Y_j}(u, w)}};$$

$$|P_{V_i V_j}(u, w)| =$$

$$\sqrt{P_{V_i V_i}(u, w) P_{V_j V_j}(u, w)} = \varphi(\tilde{y}(u, w)) \sqrt{P_{V_i V_i}(u-1, w) P_{V_j V_j}(u-1, w)};$$

$$\varphi(\tilde{y}(u, w)) = b + \left(\frac{(1-b)}{1 + 1/(g \cdot \tilde{y}(u, w))}\right)\left(1 + \frac{1}{1 + g \cdot h \cdot \tilde{y}(u, w)}\right);$$

$$\tilde{y}(u, w) = \frac{|Y_i(u, w) Y_j(u, w)|}{\sqrt{P_{V_i V_i}(u-1, w) P_{V_j V_j}(u-1, w)}}.$$

wherein, $|S(u, w)|$ is the amplitude spectrum of the noise-reduced high-frequency band signal; $H(u, w)$ is the transfer gain function; $|Y_{HF}(w, w)|$ is the amplitude spectrum of the noisy speech high-frequency band signal; $|P_{Y_i Y_j}(u, w)|$ is the cross-power spectrum of noisy speech high-frequency band signal; $|P_{V_i V_j}(u, w)|$ is the estimated cross-power spectrum of high-frequency band noise; i and j are high-frequency band signals respectively collected by two speech collection devices; $\tilde{y}(u, w)$ is the modified posterior signal-to-noise ratio; $\varphi(\tilde{y}(u, w))$ is the transfer gain function; g, b, h are constants; $|Y_i(u, w) Y_j(u, w)|$ is the cross-amplitude spectrum of the high-frequency band signal.

In an embodiment, the acquiring an amplitude spectrum and a phase spectrum of the low-frequency band signal includes:

preprocessing the low-frequency band signal, to obtain a stable low-frequency band signal;

performing Fourier transform on the stable low-frequency band signal, to obtain the amplitude spectrum and the phase spectrum of the low-frequency band signal.

In an embodiment, the preprocessing the low-frequency band signal, to obtain the stable low-frequency band signal includes:

performing a framing process and a windowing process successively on the low-frequency band signal, to obtain the stable low-frequency band signal.

In an embodiment, the acquiring the amplitude spectrum and the phase spectrum of the high-frequency band signal includes:

preprocessing the high-frequency band signal, to obtain a stable high-frequency band signal;

performing Fourier transform on the stable high-frequency band signal, to obtain the amplitude spectrum and the phase spectrum of the high-frequency band signal.

In an embodiment, the preprocessing the high-frequency band signal, to obtain the stable high-frequency band signal includes:

performing a framing process and a windowing process successively on the high-frequency band signal, to obtain the stable high-frequency band signal.

In an embodiment, the acquiring the modulation domain signal corresponding to the amplitude spectrum includes:

performing Fourier transform on the amplitude spectrum, to obtain the modulation domain signal.

In an embodiment, the performing frequency division on the noisy speech signal, to obtain a low-frequency band signal includes:

performing convex-free low-pass filtering on the noisy speech signal, to obtain a low-frequency band signal;

the performing frequency division on the noisy speech signal, to obtain a high-frequency band signal includes:

performing convex-free high-pass filtering on the noisy speech signal, to obtain a high-frequency band signal.

Some embodiments of the present disclosure further provide an apparatus for processing speech noise reduction, including:

a speech signal acquiring module, configured to acquire a noisy speech signal collected by each respective speech collection device responsive to a distance between speech collection devices reaching a preset value;

a low-frequency filtering module, configured to perform frequency division on the noisy speech signal, to obtain a low-frequency band signal;

a low-frequency band signal frequency spectrum acquiring module, configured to acquire an amplitude spectrum and a phase spectrum of the low-frequency band signal;

a modulation domain signal acquiring module, configured to acquire a modulation domain signal corresponding to the amplitude spectrum; the modulation domain signal including a modulation domain amplitude spectrum, a modulation domain power spectrum and a modulation domain phase spectrum;

a modulation domain amplitude spectrum processing module, configured to perform spectral subtraction to process the modulation domain amplitude spectrum or the power spectrum to obtain a noise-reduced modulation domain amplitude spectrum; a smoothing over-subtraction factor in the spectral subtraction being obtain according to a posterior signal-to-noise ratio of the modulation domain and a smoothing factor;

a compensating module, configured to compensate the modulation domain phase spectrum to obtain a compensated modulation domain phase spectrum;

a low-frequency band signal noise-reducing module, configured to obtain a noise-reduced low-frequency band signal based on the compensated modulation domain phase spectrum, the noise-reduced modulation domain amplitude spectrum and the phase spectrum of the low-frequency band signal; the noise-reduced low-frequency band signal is configured to synthesize a noise-reduced speech signal.

In an embodiment, the apparatus for processing speech noise reduction further includes:

a high-frequency filtering module, configured to perform frequency division on the noisy speech signal, to obtain a high-frequency band signal;

a high-frequency band signal frequency spectrum acquiring module, configured to acquire an amplitude spectrum and a phase spectrum of the high-frequency band signal;

a high-frequency band signal noise-reducing module, configured to use a transfer gain function to process an amplitude spectrum of the high-frequency band signal, to obtain an amplitude spectrum of the noise-reduced high-frequency band signal; and to obtain a noise-reduced high-frequency band signal based on the amplitude spectrum of the noise-reduced high-frequency band signal and the phase spectrum of the high-frequency band signal; the transfer gain function is obtained according to the power spectrum, a cross-power spectrum of the high-frequency band signal, and an estimated noise cross-power spectrum.

a synthesizing module, configured to synthesize the noise-reduced high-frequency band signal and the noise-reduced low-frequency band signal, to obtain a noise-reduced speech signal.

Some embodiments of the present disclosure further provide a computer device including a memory and a processor, the memory is stored with a computer program, and the processor is configured to perform the computer program to implement steps in the above methods.

Some embodiments of the present disclosure further provide a computer readable storage medium storing a computer program thereon, the computer program is executed by a processor to implement steps in the above methods.

One of the above technical solutions has the following advantages or beneficial effects:

In the above method for processing speech noise reduction, when a distance between speech collection devices is detected to reach a preset value, the acquired speech signal may have strongly correlated noise in the low frequency-band, as a result, responsive to a distance between speech collection devices reaching a preset value, a noisy speech signal is collected by each respective speech collection device, and frequency division processing is performed on the noisy speech signal to obtain a low-frequency band signal. The noise-reduced speech signal is obtained by acquiring the modulation domain signal corresponding to the amplitude spectrum of the low-frequency band signal and processing the modulation domain signal. Specifically, the noise-reduced modulation domain amplitude spectrum is obtained by performing spectral subtraction to process the modulation domain amplitude spectrum or the modulation domain power spectrum. During the process, the smoothing over-subtraction factor in the spectral subtraction is obtained according to the posterior signal-to-noise ratio of the modulation domain and the smoothing factor. In this way, speech information is prevented from being excessively eliminated due to a too large smoothing over-subtraction factor, and noise is prevented from being insufficiently suppressed due to a too small smoothing over-subtraction factor. Moreover, a sudden change between adjacent frames is prevented, so that quality of the speech signal is effectively improved. Furthermore, the compensated modulation domain phase spectrum is obtained by performing compensation on the modulation domain phase spectrum, thereby further suppressing background noise of the speech signal, and improving the quality of the speech signal. Therefore, the noise-reduced low-frequency band signal, which is obtained based on the compensated modulation domain phase spectrum, the noise-reduced modulation domain amplitude spectrum and the phase spectrum of the low-frequency band signal, has less noise, thereby high quality of the speech signal is achieved.

BRIEF DESCRIPTION OF THE DRAWINGS

Other features, objects and advantages of the present disclosure will become more apparent by reading the detailed description of non-limiting embodiments made with reference to the following drawings.

DETAILED DESCRIPTION

In order to make the object, technical solutions and advantages of the present disclosure more clearly understood, the present disclosure will be described in further detail below with reference to the accompanying drawings and embodiments. It should be understood that the specific embodiments described herein are only used to explain the present disclosure, but not to limit the present disclosure.

Figure 1:
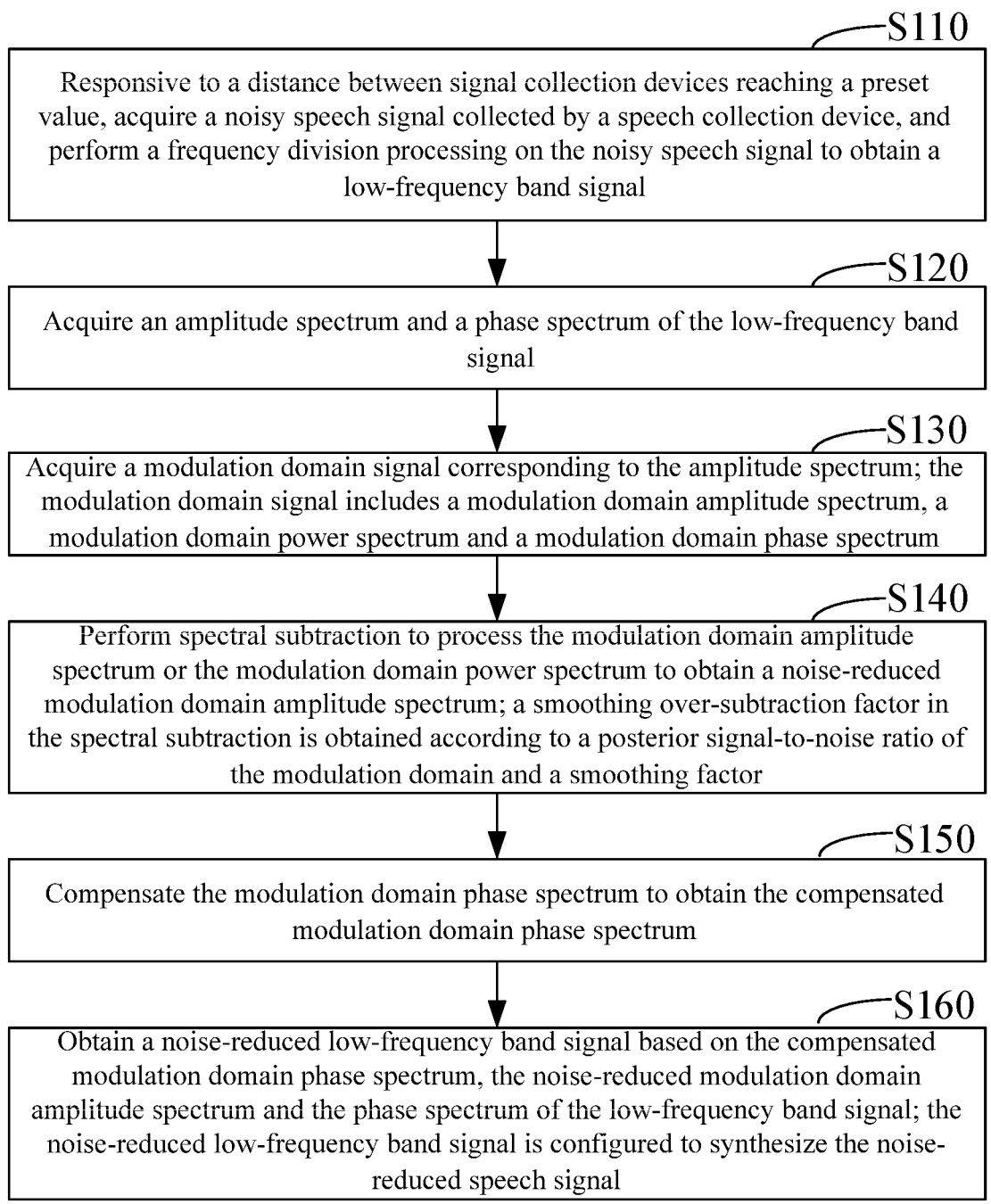
FIG. 1 is a first schematic flow chart of a method for processing speech noise reduction according to an embodiment.

In an embodiment, as shown in FIG. 1, a method for processing speech noise reduction is provided, including following steps.

In S110, responsive to a distance between speech collection devices reaching a preset value, collect a noisy speech signal by each respective speech collection device, and perform a frequency division processing on the noisy speech signal to obtain a low-frequency band signal.

The speech collection device may be any device for collecting speech in the related art. In a specific example, the speech collection device is a microphone. The preset value may be 16 cm.

Specifically, the noisy speech signal collected by the speech collection device may be performed by any method in the related art. In a specific example, a method for collecting a noisy speech signal includes calling the noisy speech signal from the speech collection device. The performing frequency division on the noisy speech signal to obtain a low-frequency band signal may be achieved by any method in the related art. In an embodiment, the noisy speech signal may be low-pass filtered to obtain a low-frequency band signal. In a specific example, the noisy speech signal is convex-free low-pass filtered at a frequency division point to obtain the low-frequency band signal, and thus, there is no convex at the frequency division point in the subsequent speech synthesis process.

In S120, acquire an amplitude spectrum and a phase spectrum of the low-frequency band signal.

Specifically, the low-frequency band signal is Fourier transformed, to obtain the amplitude spectrum and the phase spectrum of the low-frequency band signal. It shall be noted that the amplitude spectrum and the phase spectrum of the low-frequency band signal may be acquired by any method in the related art.

In S130, acquire a modulation domain signal corresponding to the amplitude spectrum; the modulation domain signal includes a modulation domain amplitude spectrum, a modulation domain power spectrum and a modulation domain phase spectrum.

Specifically, the modulation domain signal corresponding to the amplitude spectrum may be acquired by any method in the related art. In a specific example, the acquiring the modulation domain signal corresponding to the amplitude spectrum may include performing Fourier transform on the amplitude spectrum to obtain the modulation domain signal. Further, the amplitude spectrum is short-time Fourier transformed at every frequency point frame by frame, to obtain the modulation domain signal. The modulation domain signal includes a modulation domain amplitude spectrum, a modulation domain power spectrum and a modulation domain phase spectrum.

In S140, perform spectral subtraction to process the modulation domain amplitude spectrum or the modulation domain power spectrum to obtain a noise-reduced modulation domain amplitude spectrum; a smoothing over-subtraction factor in the spectral subtraction is obtained according to a posterior signal-to-noise ratio of the modulation domain and a smoothing factor.

The modulation domain amplitude spectrum or the modulation domain power spectrum is processed by performing spectral subtraction, to obtain a noise-reduced modulation domain amplitude spectrum.

Specifically, the modulation domain amplitude spectrum is processed by performing spectral subtraction, to obtain the noise-reduced modulation domain amplitude spectrum. Alternately, the modulation domain power spectrum is processed by performing spectral subtraction, to obtain a noise-reduced modulation domain power spectrum; the noise-reduced modulation domain power spectrum may be conversed to the noise-reduced modulation domain amplitude spectrum. The conversion method is not described herein.

In an embodiment, in the performing spectral subtraction to process the modulation domain amplitude spectrum or the modulation domain power spectrum to obtain the noise-reduced modulation domain amplitude spectrum, the noise-reduced modulation domain amplitude spectrum is obtained based on the following formula:

$$|S(u, w, k)|^p =$$
$$\begin{cases} |Y_{LF}(u, w, k)|^p - \alpha(k)|V(u, w, k)|^p, & |Y_{LF}(u, w, k)|^p \geq \alpha(k)|V(u, w, k)|^p \\ \beta|V(u, w, k)|^p, & \text{others} \end{cases};$$

$$\alpha(k) = \theta\alpha(k-1) + (1-\theta)\left(\alpha_0 - \frac{4}{15}SNR_{post}(u, w, k)\right).$$

wherein, u is a modulation frame variable; w is a discrete frequency variable; k is a modulation domain variable; |S (u, w, k)| is the noise-reduced modulation domain amplitude spectrum; p is a type of the spectral subtraction, p=1 indicates that a spectral subtraction of the modulation domain amplitude spectrum is adopted, while p=2 indicates that a spectral subtraction of the modulation domain power spectrum is adopted; if p=1, |V(u, w, k)|$^p$ is the estimated noise modulation domain amplitude spectrum, if p=2, |V(u, w, k)|$^p$ is the estimated noise modulation domain power spectrum; α(k) is the modulation domain smoothing over-subtraction factor; |Y$_{LF}$(u, w, k)|$^p$ is the modulation domain amplitude spectrum or modulation domain power spectrum;

$SNR_{post}(u, w, k)$ is a posterior signal-to-noise ratio of the modulation domain; $\theta$ is a smoothing factor; $\alpha_0$ is a constant.

In S150, compensate the modulation domain phase spectrum to obtain a compensated modulation domain phase spectrum.

During processing the speech noise reduction, the modulation domain phase spectrum may be further processed to suppress the background noise, so as to improve the speech quality. The amplitude spectrum is a real signal, so that the obtained modulation domain signal is conjugate symmetric. In view of this, it may change an angle relation between conjugate items by using an antisymmetric function, to further compensate the modulation domain phase spectrum, so as to obtain the compensated modulation domain phase spectrum.

In S106, obtain a noise-reduced low-frequency band signal based on the compensated modulation domain phase spectrum, the noise-reduced modulation domain amplitude spectrum and the phase spectrum of the low-frequency band signal; the noise-reduced low-frequency band signal is configured to synthesize the noise-reduced speech signal.

Specifically, the noise-reduced low-frequency band signal may be obtained according to the compensated modulation domain phase spectrum, the noise-reduced modulation domain amplitude spectrum and the phase spectrum of the low-frequency band signal. The noise-reduced low-frequency band signal may be used to synthesize the noise-reduced speech signal. In an embodiment, a high-frequency band signal of the speech signal is obtained, the high-frequency band signal and the noise-reduced low-frequency band signal are synthesized to obtained the noise-reduced speech signal. Alternately, a high-frequency band signal of the speech signal is obtained, then the high-frequency band signal is noise-reduced, after that, the noise-reduced high-frequency band signal and the noise-reduced high-frequency band signal are synthesized to obtain the noise-reduced speech signal. It shall be noted that the noise-reduced processing method for the high-frequency band signal may be any method in the related art, which is not specifically limited herein. The signal synthesis may be performed in a manner used in the related art.

In the above method for processing speech noise reduction, when a distance between speech collection devices is detected to reach a preset value, the acquired speech signal may have strongly correlated noise in the low frequency-band, as a result, responsive to a distance between speech collection devices reaching a preset value, a noisy speech signal is collected by each respective speech collection device, and frequency division processing is performed on the noisy speech signal to obtain a low-frequency band signal. The noise-reduced speech signal is obtained by acquiring the modulation domain signal corresponding to the amplitude spectrum of the low-frequency band signal and processing the modulation domain signal. Specifically, the noise-reduced modulation domain amplitude spectrum is obtained by performing spectral subtraction to process the modulation domain amplitude spectrum or the modulation domain power spectrum. During the process, the smoothing over-subtraction factor in the spectral subtraction is obtained according to the posterior signal-to-noise ratio of the modulation domain and the smoothing factor. In this way, speech information is prevented from being excessively eliminated due to a too large smoothing over-subtraction factor, and noise is prevented from being insufficiently suppressed due to a too small smoothing over-subtraction factor. Moreover, a sudden change between adjacent frames is prevented, so that quality of the speech signal is effectively improved.

Furthermore, the compensated modulation domain phase spectrum is obtained by performing compensation on the modulation domain phase spectrum, thereby further suppressing background noise of the speech signal, and improving the quality of the speech signal. Therefore, the noise-reduced low-frequency band signal, which is obtained based on the compensated modulation domain phase spectrum, the noise-reduced modulation domain amplitude spectrum and the phase spectrum of the low-frequency band signal, has less noise, thereby high quality of the speech signal is achieved.

Figure 2:
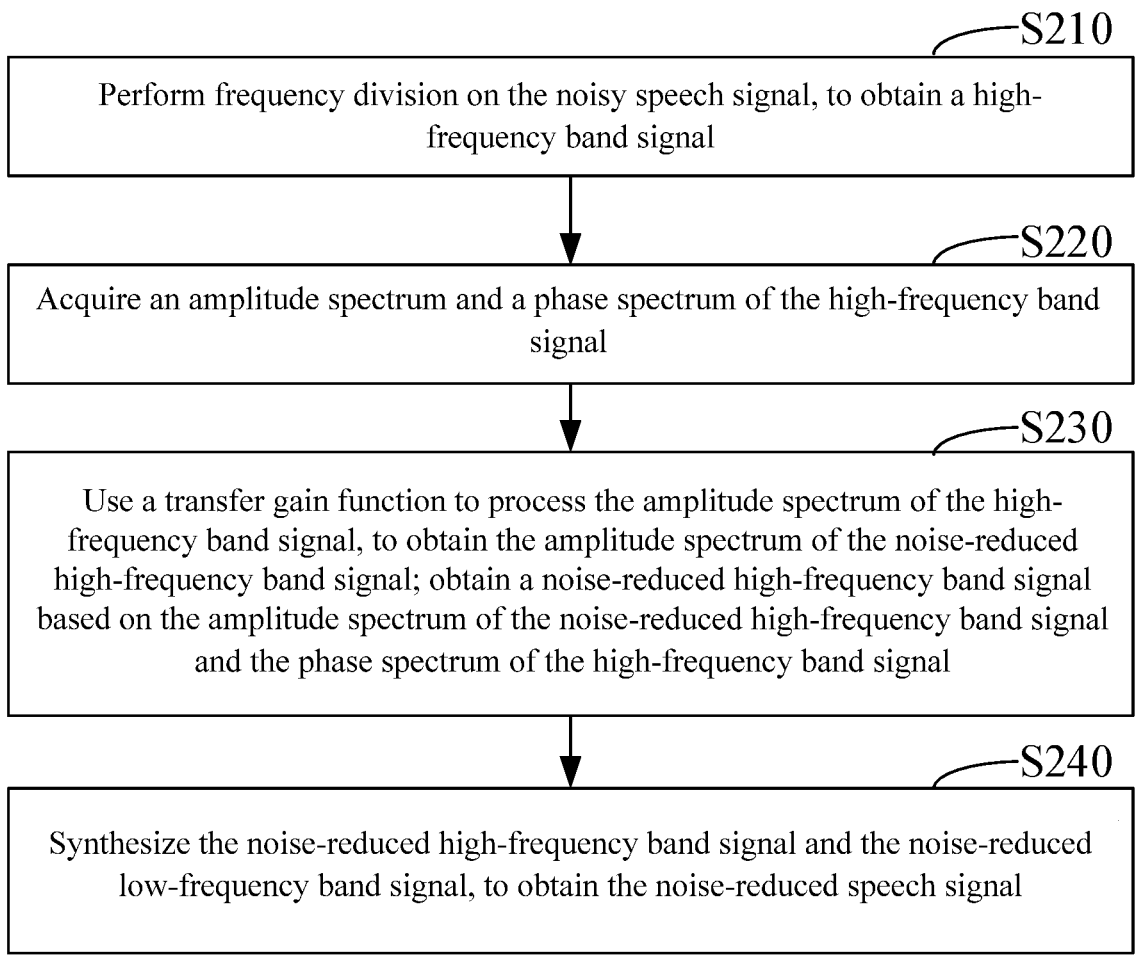
FIG. 2 is a second schematic flow chart of a method for processing speech noise reduction according to an embodiment.

In an embodiment, as shown in FIG. 2, the method further includes following steps.

In S210, perform frequency division on the noisy speech signal, to obtain a high-frequency band signal.

Specifically, the noisy speech signal is collected by the speech collection device may be achieved by any method in the related art. In a specific example, a method for collecting a noisy speech signal includes calling the noisy speech signal from the speech collection device. The performing frequency division on the noisy speech signal to obtain the high-frequency band signal may be achieved by any method in the related art. In a specific example, the noisy speech signal is convex-free high-pass filtered at a frequency division point to obtain the high-frequency band signal, as a result, there is no convex at the frequency division point in the subsequent speech synthesis process. It shall be noted that, the performing frequency division on the noisy speech signal to obtain the high-frequency band signal may be executed along with the S210, that is, the frequency division is performed once to obtain the high-frequency band signal and the low-frequency band signal.

In S220, acquire an amplitude spectrum and a phase spectrum of the high-frequency band signal.

Specifically, the high-frequency band signal is Fourier transformed, to obtain the amplitude spectrum and the phase spectrum of the high-frequency band signal. It shall be noted that the amplitude spectrum and the phase spectrum of the high-frequency band signal may be acquired by any method in the related art.

In S230, use a transfer gain function to process the amplitude spectrum of the high-frequency band signal, to obtain the amplitude spectrum of the noise-reduced high-frequency band signal; obtain a noise-reduced high-frequency band signal based on the amplitude spectrum of the noise-reduced high-frequency band signal and the phase spectrum of the high-frequency band signal; the transfer gain function is obtained according to the power spectrum, a cross-power spectrum of the high-frequency band signal, and an estimated noise cross-power spectrum.

Specifically, a transfer gain function is used to process the amplitude spectrum of the high-frequency band signal, to obtain the amplitude spectrum of the noise-reduced high-frequency band signal. It shall be noted that when a distance between two microphones reaches a preset value, there is weakly correlated noise in the high-frequency band of the speech signal. By using the transfer gain function to process the amplitude spectrum of the high-frequency band signal, the weakly correlated noise can be effectively suppressed.

In an embodiment, in the using the transfer gain function to process the amplitude spectrum of the high-frequency band signal, to obtain the amplitude spectrum of the noise-reduced high-frequency band signal, the amplitude spectrum of the noise-reduced high-frequency band signal is obtained based on the following formula:

$$|S(u, w)| = |Y_{HF}(u, w)||H(u, w);$$

$$H(u, w) = \frac{|P_{Y_iY_j}(u, w)| - |P_{V_iV_j}(u, w)|}{\sqrt{P_{Y_iY_i}(u, w)P_{Y_jY_j}(u, w)}};$$

$$|P_{V_iV_j}(u, w)| =$$

$$\sqrt{P_{V_iV_i}(u, w)P_{V_jV_j}(u, w)} = \varphi(\tilde{\gamma}(u, w))\sqrt{P_{V_iV_i}(u-1, w)P_{V_jV_j}(u-1, w)};$$

$$\varphi(\tilde{\gamma}(u, w)) = b + \left(\frac{(1-b)}{1 + 1/(g \cdot \tilde{\gamma}(u, w))}\right)\left(1 + \frac{1}{1 + g \cdot h \cdot \tilde{\gamma}(u, w)}\right);$$

$$\tilde{\gamma}(u, w) = \frac{|Y_i(u, w)Y_j(u, w)|}{\sqrt{P_{V_iV_i}(u-1, w)P_{V_jV_j}(u-1, w)}}.$$

wherein, |S(u, w)| is the amplitude spectrum of the noise-reduced high-frequency band signal; H(u, w) is the transfer gain function; |$Y_{HF}$(u, w)| is the amplitude spectrum of noisy speech high-frequency band signal; |$P_{Y_iY_j}$(u, w)| is the cross-power spectrum of noisy speech high-frequency band signal; |$P_{V_iV_j}$(u, w)| is the estimated cross-power spectrum of high-frequency band noise; i and j are high-frequency band signals respectively collected by two speech collection devices; ỹ(u, w) is the modified posterior signal-to-noise ratio; φ(u, w)) is the transfer gain function; g, b, h are constants; |$Y_i$(u, w)$Y_j$(u, w) is the cross-amplitude spectrum of the high-frequency band signal.

In a specific example, the obtaining the noise-reduced high-frequency band signal based on the amplitude spectrum of the noise-reduced high-frequency band signal and phase spectrum of the high-frequency band signal includes: performing inverse-Fourier transformation and overlap-add processing successively on the amplitude spectrum of the high-frequency band signal and the amplitude spectrum of the noise-reduced high-frequency band signal, to obtain the noise-reduced high-frequency band signal. It shall be noted that the high-frequency band signal may be acquired by any method in the related art.

In S240, synthesize the noise-reduced high-frequency band signal and the noise-reduced low-frequency band signal, to obtain the noise-reduced speech signal.

The noise-reduced high-frequency band signal and the noise-reduced high-frequency band signal are synthesized to obtain the noise-reduced speech signal. It shall be noted that the synthesizing method may be any method in the related art, which is not specifically limited herein.

In the above method for processing speech noise reduction, when a distance between speech collection devices is detected to reach a preset value, the acquired speech signal may have weakly correlated noise in the high frequency-band, as a result, responsive to a distance between speech collection devices reaching a preset value, a noisy speech signal is collected by each respective speech collection device, and frequency division processing is performed on the noisy speech signal to obtain the high-frequency band signal. The amplitude spectrum of the high-frequency band signal is processed by using the transfer gain function, to obtain the amplitude spectrum of the noise-reduced high-frequency band signal. The noise-reduced high-frequency band signal, which is obtained based on the amplitude spectrum of the noise-reduced high-frequency band signal and the phase spectrum of the high-frequency band signal, may have less noise. On account of the noise characteristics of the high-frequency band signal and the low-frequency band signal, different noise-reduced processing methods are adopted to acquire the speech signal with less noise.

Figure 3:
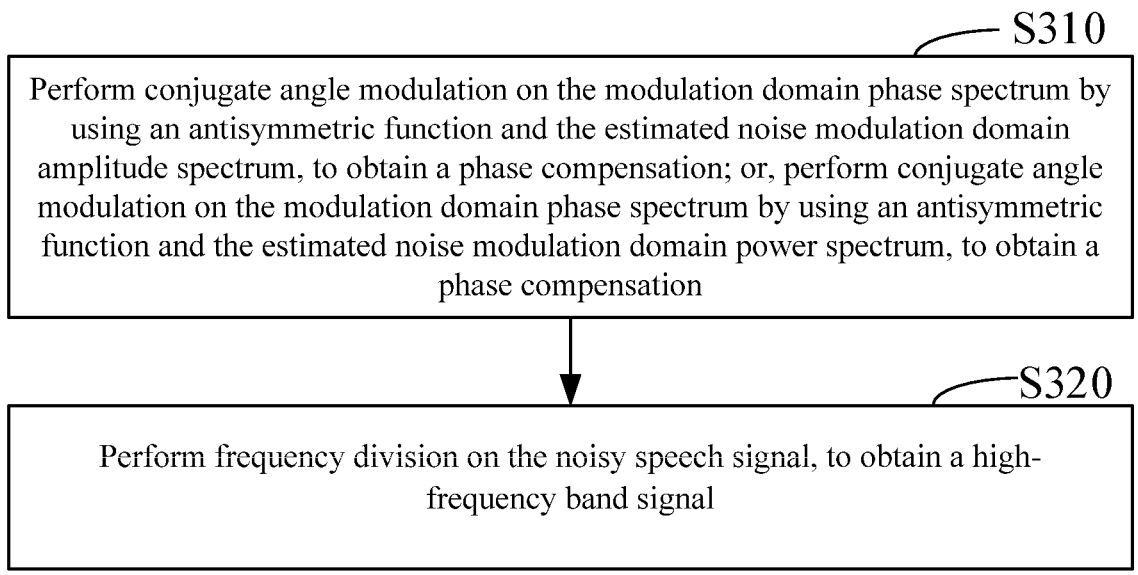
FIG. 3 is a flow chart for compensating a modulation domain phase spectrum to obtain a compensated modulation domain phase spectrum according to an embodiment.

In an embodiment, as shown in FIG. 3, the compensating the modulation domain phase spectrum to obtain the compensated modulation domain phase spectrum includes following steps.

In S310, perform conjugate angle modulation on the modulation domain phase spectrum by using an antisymmetric function and the estimated noise modulation domain amplitude spectrum, to obtain a phase compensation;

Or, perform conjugate angle modulation on the modulation domain phase spectrum by using an antisymmetric function and the estimated noise modulation domain power spectrum, to obtain a phase compensation.

During processing the speech noise reduction, the modulation domain phase spectrum may be further processed to suppress the background noise, so as to improve the speech quality. The amplitude spectrum is a real signal, so that the obtained modulation domain signal is conjugate symmetric. In view of this, it may change the angle relation between conjugate items of the modulation domain phase spectrum by using the antisymmetric function and the estimated noise modulation domain amplitude spectrum, to further compensate the modulation domain phase spectrum, so as to obtain the compensated modulation domain phase spectrum.

It shall be noted that the estimated noise modulation domain amplitude spectrum or the estimated noise modulation domain phase spectrum may be obtained according to the modulation domain amplitude spectrum of the noisy speech signal.

In an embodiment, in the performing conjugate angle modulation on the modulation domain phase spectrum by using the antisymmetric function and the estimated noise modulation domain amplitude spectrum to obtain the phase compensation, the phase compensation is obtained based on the following formula:

$$\Lambda(u, w, k) = \xi\varphi(k)|V(u, w, k)|^1;$$

wherein, u is the modulation frame variable; w the discrete frequency variable; k is the modulation domain variable; Λ(u, w, k) is the phase compensation; φ(k) is the antisymmetric function; ξ is a constant; |V(u, w, k)| is the estimated noise modulation domain amplitude spectrum.

In the performing conjugate angle modulation on the modulation domain phase spectrum by using the antisymmetric function and the estimated noise modulation domain power spectrum to obtain a phase compensation, the phase compensation is obtained based on the following formula:

$$\Lambda(u, w, k) = \xi\varphi(k)|V(u, w, k)|^2;$$

wherein, u is the modulation frame variable; w is the discrete frequency variable; k is the modulation domain variable; Λ(u, w, k) is the phase compensation; φ(k) is the antisymmetric function; ξ is a constant; |V(u, w, k)|² is the estimated noise modulation domain power spectrum.

In S320, obtain a compensated modulation domain phase spectrum according to the phase compensation and the modulation domain phase spectrum.

Specifically, after the phase compensation is obtained, the modulation domain phase spectrum may be processed based on the phase compensation, to obtain the compensated modulation domain phase spectrum.

In a specific example, in the obtaining the compensated modulation domain phase spectrum according to the phase compensation and the modulation domain phase spectrum, the compensated phase spectrum is obtained based on the following formula:

$$\text{angle}[S(u, w, k)] = \text{angle}[Y_{LF}(u, w, k)] + \Lambda(u, w, k);$$

In the above method for processing speech noise reduction, the phase compensation is obtained and the modulation domain phase spectrum is processed based on the phase compensation, so that the compensated modulation domain phase spectrum is obtained, and the strongly correlated noise in the low-frequency band signal can be suppressed accordingly.

Figure 4:
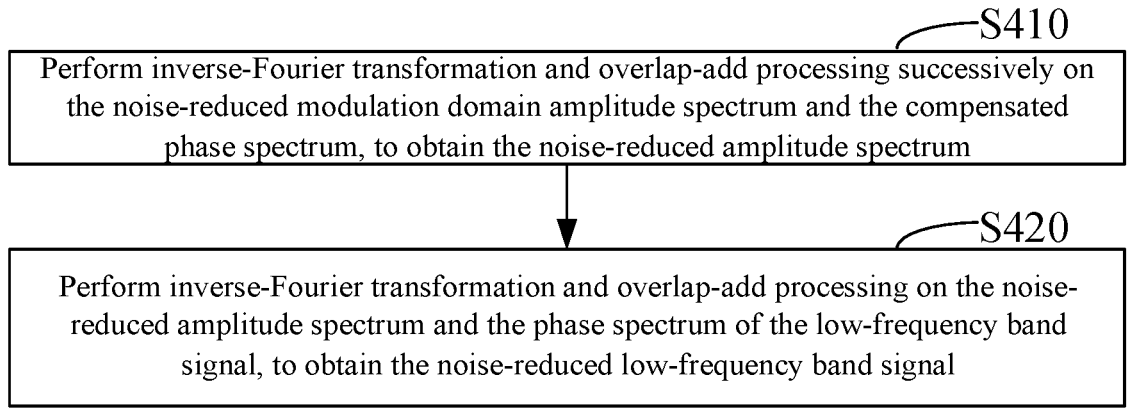
FIG. 4 is a flow chart for obtaining a noise-reduced low-frequency band signal based on a compensated modulation domain phase spectrum, a noise-reduced modulation domain amplitude spectrum and a phase spectrum of the low-frequency band signal according to an embodiment.

In an embodiment, as shown in FIG. 4, the obtaining the noise-reduced low-frequency band signal based on the compensated modulation domain phase spectrum, the noise-reduced modulation domain amplitude spectrum and the phase spectrum of the low-frequency band signal includes following steps.

In S410, perform inverse-Fourier transformation and overlap-add processing successively on the noise-reduced modulation domain amplitude spectrum and the compensated phase spectrum, to obtain the noise-reduced amplitude spectrum.

The inverse-Fourier transformation is one of conventional methods for signal processing, which is not described in detail herein.

Specifically, the inverse-Fourier transformation is performed on the noise-reduced modulation domain amplitude spectrum and the compensated phase spectrum, then the overlap-add processing is performed on the inverse-Fourier transformed results, to obtain the noise-reduced amplitude spectrum.

In S420, perform inverse-Fourier transformation and overlap-add processing on the noise-reduced amplitude spectrum and the phase spectrum of the low-frequency band signal, to obtain the noise-reduced low-frequency band signal.

Specifically, the inverse-Fourier transformation is performed on the noise-reduced modulation domain amplitude spectrum and the phase spectrum of the low-frequency band signal, then the overlap-add processing is performed on the inverse-Fourier transformed results, to obtain the noise-reduced low-frequency band signal.

Figure 5:
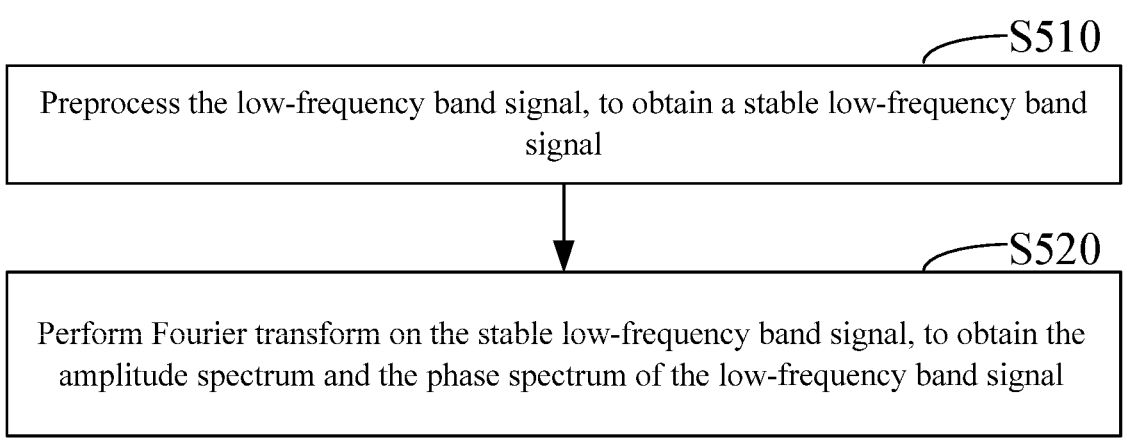
FIG. 5 is a flow chart for acquiring an amplitude spectrum and a phase spectrum of the low-frequency band signal according to an embodiment.

In an embodiment, as shown in FIG. 5, the acquiring the amplitude spectrum and the phase spectrum of the low-frequency band signal includes following steps.

In S510, preprocess the low-frequency band signal, to obtain a stable low-frequency band signal.

Specifically, the low-frequency band signal is preprocessed to obtain a stable low-frequency band signal. The preprocessing method may be any method in the related art, which is not specifically limited herein.

In S520, perform Fourier transform on the stable low-frequency band signal, to obtain the amplitude spectrum and the phase spectrum of the low-frequency band signal.

The Fourier transform is performed on the stable low-frequency band signal to obtain the frequency expression for the low-frequency band signal, so as to obtain the amplitude spectrum and the phase spectrum of the low-frequency band signal.

In an embodiment, the preprocessing the low-frequency band signal to obtain a stable low-frequency band signal includes: performing a framing process and a windowing process successively on the low-frequency band signal, to obtain the stable low-frequency band signal.

In the above speech noise reduction method, the low-frequency band signal is preprocessed, so as to obtain the stable low-frequency band signal. Specifically, the speech signal is macroscopically unstable but microscopically stable, so that the speech signal may be divided in units of one frame. After the speech signal is divided into frames, a windowing processing may be performed thereon, that is, the frame divided speech signal is multiplied by a window function, so as to reduce spectrum leakage.

Figure 6:
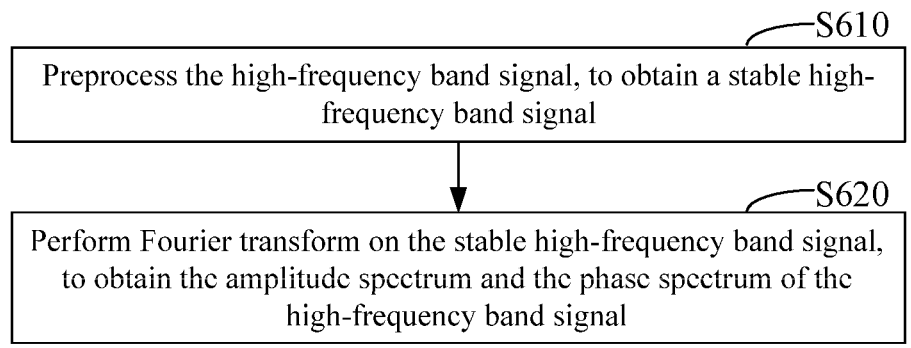
FIG. 6 is a flow chart for acquiring an amplitude spectrum and a phase spectrum of the high-frequency band signal according to an embodiment.

In an embodiment, as shown in FIG. 6, the acquiring the amplitude spectrum and the phase spectrum of the high-frequency band signal includes following steps.

In S610, preprocess the high-frequency band signal, to obtain a stable high-frequency band signal.

Specifically, the high-frequency band signal is preprocessed, to obtain a stable high-frequency band signal. The preprocessing method may be any method in the related art, which is not specifically limited herein.

In S620, perform Fourier transform on the stable high-frequency band signal, to obtain the amplitude spectrum and the phase spectrum of the high-frequency band signal.

The Fourier transform is performed on the stable high-frequency band signal, to obtain a frequency expression for the high-frequency band signal, so as to obtain the amplitude spectrum and the phase spectrum of the high-frequency band signal.

In an embodiment, the preprocessing the high-frequency band signal to obtain the stable high-frequency band signal includes: performing the framing process and the windowing process successively on the high-frequency band signal, to obtain the stable high-frequency band signal.

In the above speech noise reduction method, the high-frequency band signal is preprocessed, so as to obtain the stable high-frequency band signal. Specifically, the speech signal is macroscopically unstable but microscopically stable, so that the speech signal may be divided in units of one frame. After the speech signal is divided into frames, a windowing processing may be performed thereon, that is, the frame divided speech signal is multiplied by a window function, so as to reduce spectrum leakage.

In a specific embodiment, the performing frequency division on the noisy speech signal to obtain a low-frequency band signal includes:

performing convex-free low-pass filtering on the noisy speech signal, to obtain a low-frequency band signal.

The performing frequency division on the noisy speech signal to obtain the high-frequency band signal includes:

performing convex-free high-pass filtering on the noisy speech signal to obtain the high-frequency band signal.

In the above method for processing speech noise reduction, the noisy speech signal is convex-free low-pass filtered at a frequency division point to obtain the low-frequency band signal and the high-frequency band signal, therefore, there is no convex at the frequency division point.

It shall be understood that although the steps in the flowcharts of FIGS. 1-6 are shown in sequence according to the arrows, these steps are not necessarily executed in the sequence shown by the arrows. Unless explicitly stated herein, the execution of these steps is not strictly limited to the order, and these steps may be performed in other orders. Moreover, at least some of the steps in FIGS. 1-6 may include multiple sub-steps or multiple stages, and these sub-steps or stages are not necessarily executed and completed at the same time, but may be executed at different times. The execution order of these sub-steps or stages is not necessarily sequential, but may be performed in turn or alternately with at least some of other steps, sub-steps or stages of other steps.

Figure 7:
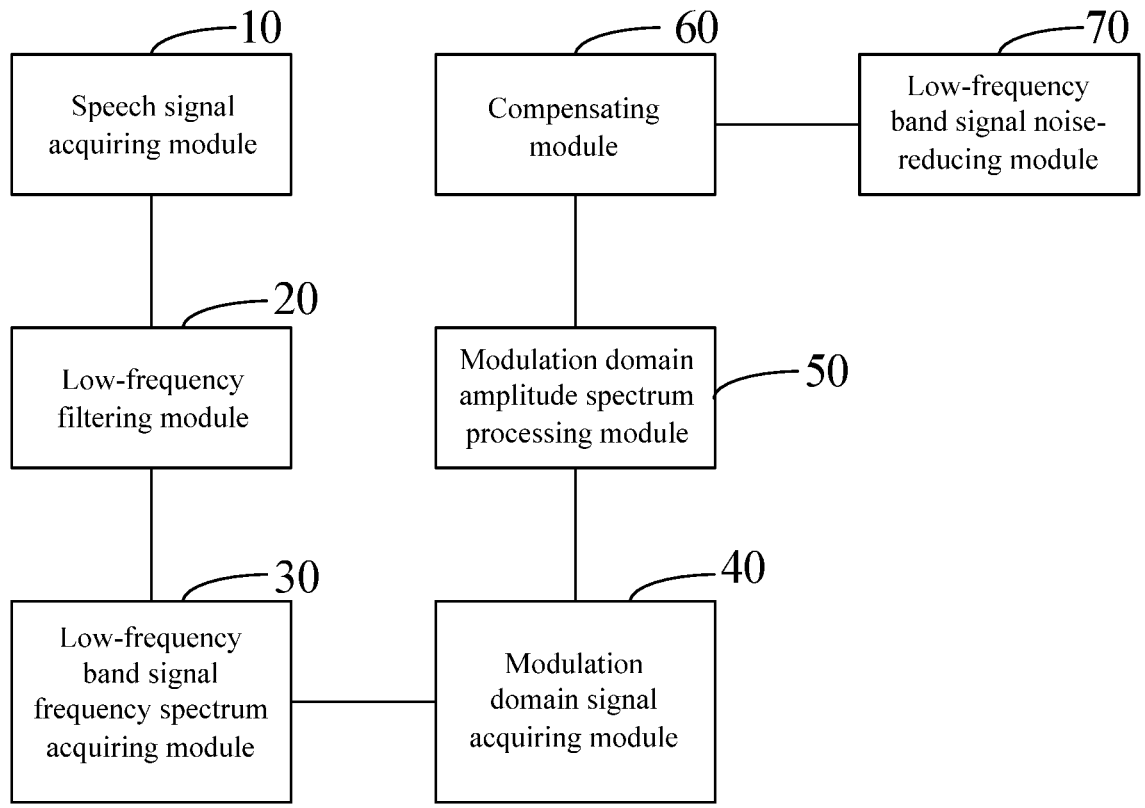
FIG. 7 is a first schematic diagram of an apparatus for processing speech noise reduction according to an embodiment.

In an embodiment, as shown in FIG. 7, an apparatus for processing speech noise reduction is provided, including following modules:

a speech signal acquiring module 10, configured to acquire a noisy speech signal collected by each respective speech collection device responsive to a distance between speech collection devices reaching a preset value;

a low-frequency filtering module 20, configured to perform frequency division on the noisy speech signal, to obtain a low-frequency band signal;

a low-frequency band signal frequency spectrum acquiring module 30, configured to acquire an amplitude spectrum and a phase spectrum of the low-frequency band signal;

a modulation domain signal acquiring module 40, configured to acquire a modulation domain signal corresponding to the amplitude spectrum; the modulation domain signal including a modulation domain amplitude spectrum, a modulation domain power spectrum and a modulation domain phase spectrum;

a modulation domain amplitude spectrum processing module 50, configured to perform spectral subtraction to process the modulation domain amplitude spectrum or the power spectrum to obtain a noise-reduced modulation domain amplitude spectrum; a smoothing over-subtraction factor in the spectral subtraction being obtained according to a posterior signal-to-noise ratio of the modulation domain and a smoothing factor;

a compensating module 60, configured to compensate the modulation domain phase spectrum to obtain the compensated modulation domain phase spectrum; and a low-frequency band signal noise-reducing module 70, configured to obtain a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

Figure 8:
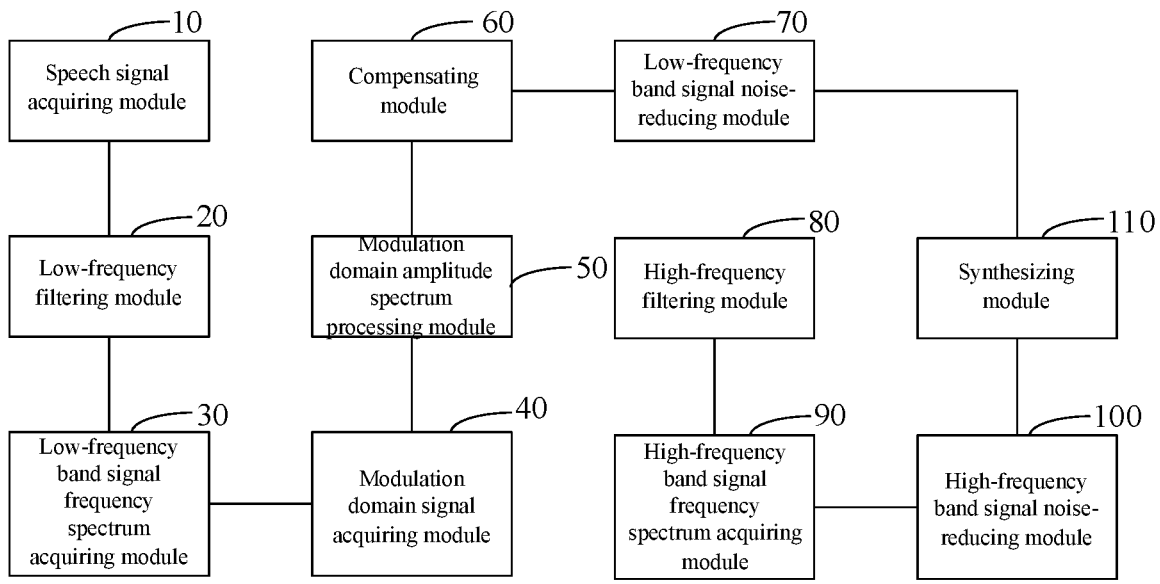
FIG. 8 is a second schematic diagram of an apparatus for processing speech noise reduction according to an embodiment.

In an embodiment, as shown in FIG. 8, the apparatus for processing speech noise reduction further includes:

a high-frequency filtering module 80, configured to perform frequency division on the noisy speech signal, to obtain a high-frequency band signal;

a high-frequency band signal frequency spectrum acquiring module 90, configured to acquire an amplitude spectrum and a phase spectrum of the high-frequency band signal;

a high-frequency band signal noise-reducing module 100, configured to use a transfer gain function to process the amplitude spectrum of the high-frequency band signal to obtain the amplitude spectrum of the noise-reduced high-frequency band signal; to obtain a noise-reduced high-frequency band signal based on the amplitude spectrum of the noise-reduced high-frequency band signal and the phase spectrum of the high-frequency band signal; the transfer gain function being obtained according to the power spectrum, a cross-power spectrum of the high-frequency band signal and an estimated noise cross-power spectrum.

a synthesizing module 110, configured to synthesize the noise-reduced high-frequency band signal and the noise-reduced low-frequency band signal, to obtain the noise-reduced speech signal.

Regarding the specific limitation of the apparatus for processing speech noise reduction, reference may be made to the limitation of the above method for processing speech noise reduction, which will not be repeated herein. Each module in the above-mentioned apparatus for processing speech noise reduction may be implemented in whole or in part by software, hardware and combinations thereof. The above modules may be embedded in or independent of the processor in the computer device in the form of hardware, or may be stored in the memory in the computer device in the form of software, so that the processor may call and execute the corresponding operations of the above modules.

Figure 9:
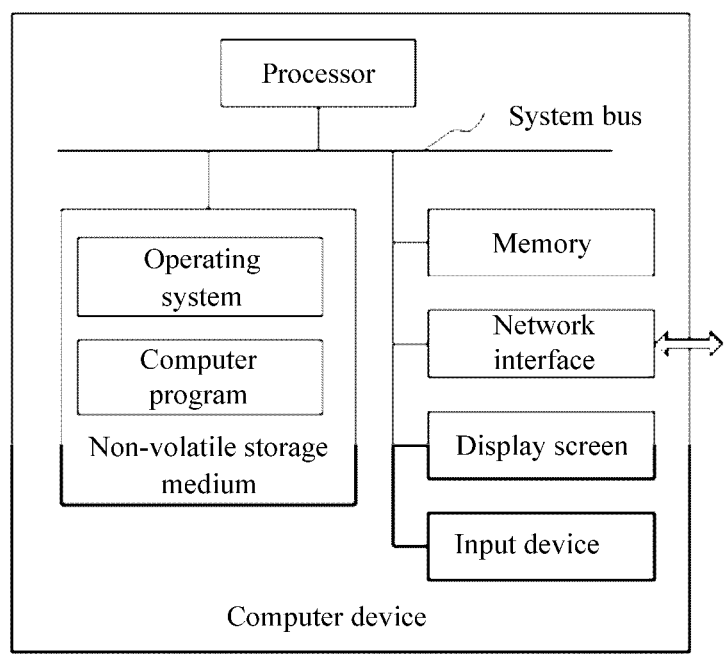
FIG. 9 is a diagram showing an internal architecture of a computer device according to an embodiment.

In an embodiment, a computer device is provided. The computer device may be a terminal, and FIG. 9 shows an internal diagram of the computer device. The computer device includes a processor, a memory, a network interface, a display screen, and an input device connected by a system bus. Among them, the processor of the computer device is configured to provide computing and control capabilities. The memory of the computer device includes a non-volatile storage medium and an internal memory. The non-volatile storage medium stores an operating system and a computer program. The internal memory provides an environment for the execution of the operating system and the computer program in the non-volatile storage medium. The network interface of the computer device is configured to communicate with an external terminal through network connection. The computer program implements the method for processing speech noise reduction when executed by the processor. The display screen of the computer equipment may be a liquid crystal display screen or an electronic ink display screen, and the input device of the computer device may be a touch layer covered on the display screen, or a button, a trackball or a touchpad on a shell of the computer device, or an external keyboard, trackpad, or mouse, etc.

Those skilled in the art may understand that the structure shown in FIG. 9 is only a block diagram of a part of structure relevant to the solution of the disclosure, and does not constitute a limitation to the computer device on which the solution of the disclosure is applied. The computer device may include more or less components than those shown in the figures, or combine certain components, or have a different arrangement of components.

Some embodiments of the present disclosure further provide a computer device including a memory and a processor, the memory is stored with a computer program, and the processor is configured to perform the computer program to implement the following steps:

responsive to a distance between speech collection devices reaching a preset value, acquiring a noisy speech signal collected by each respective speech collection device, and performing frequency division processing on the noisy speech signal to obtain a low-frequency band signal;

acquiring an amplitude spectrum and a phase spectrum of the low-frequency band signal;

acquiring a modulation domain signal corresponding to the amplitude spectrum; the modulation domain signal including a modulation domain amplitude spectrum, a modulation domain power spectrum and a modulation domain phase spectrum;

performing spectral subtraction to process the modulation domain amplitude spectrum or the modulation domain power spectrum to obtain a noise-reduced modulation domain amplitude spectrum; a smoothing over-subtraction factor in the spectral subtraction being obtained according to a posterior signal-to-noise ratio of the modulation domain and a smoothing factor;

compensating the modulation domain phase spectrum to obtain a compensated modulation domain phase spectrum;

obtaining a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

In an embodiment, the processor further performs the computer program to implement the following steps:

performing frequency division on the noisy speech signal, to obtain a high-frequency band signal;

acquiring an amplitude spectrum and a phase spectrum of the high-frequency band signal;

using a transfer gain function to process the amplitude spectrum of the high-frequency band signal, to obtain the amplitude spectrum of the noise-reduced high-frequency band signal; obtaining a noise-reduced high-frequency band signal based on the amplitude spectrum of the noise-reduced high-frequency band signal and the phase spectrum of the high-frequency band signal; the transfer gain function is obtained according to the power spectrum, a cross-power spectrum of the high-frequency band signal, and an estimated noise cross-power spectrum.

synthesizing the noise-reduced high-frequency band signal and the noise-reduced high-frequency band signal, to obtain the noise-reduced speech signal.

Some embodiments of the present disclosure further provide a computer readable storage medium storing a computer program thereon, the computer program is executed by a processor to implement the following steps:

responsive to a distance between speech collection devices reaching a preset value, acquiring a noisy speech signal collected by each respective speech collection device, and performing frequency division processing on the noisy speech signal to obtain a low-frequency band signal;

acquiring an amplitude spectrum and a phase spectrum of the low-frequency band signal;

acquiring a modulation domain signal corresponding to the amplitude spectrum; the modulation domain signal including a modulation domain amplitude spectrum, a modulation domain power spectrum and a modulation domain phase spectrum;

performing spectral subtraction to process the modulation domain amplitude spectrum or the modulation domain power spectrum to obtain a noise-reduced modulation domain amplitude spectrum; a smoothing over-subtraction factor in the spectral subtraction being obtained according to a posterior signal-to-noise ratio of the modulation domain and a smoothing factor;

compensating the modulation domain phase spectrum to obtain a compensated modulation domain phase spectrum;

obtaining a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

In an embodiment, computer program is executed by the processor to further implement the following steps:

performing frequency division on the noisy speech signal, to obtain a high-frequency band signal;

acquiring an amplitude spectrum and a phase spectrum of the high-frequency band signal;

using a transfer gain function to process the amplitude spectrum of the high-frequency band signal, to obtain the amplitude spectrum of the noise-reduced high-frequency band signal; obtaining a noise-reduced high-frequency band signal based on the amplitude spectrum of the noise-reduced high-frequency band signal and the phase spectrum of the high-frequency band signal; the transfer gain function is obtained according to the power spectrum, a cross-power spectrum of the high-frequency band signal, and an estimated noise cross-power spectrum.

synthesizing the noise-reduced high-frequency band signal and the noise-reduced high-frequency band signal, to obtain the noise-reduced speech signal.

Those of ordinary skill in the art may understand that all or part of the process in the method of the above-mentioned embodiments may be implemented by instructing the relevant hardware through a computer program, and the computer program may be stored in a non-volatile computer readable storage medium. When the computer program is executed, it may cause the processes of the embodiments of the above-mentioned methods. Any reference to memory, storage, database or other medium used in the various embodiments provided in this disclosure may include non-volatile and/or volatile memory. The non-volatile memory may include the read only memory (ROM), the programmable ROM (PROM), the electrically programmable ROM (EPROM), the electrically erasable programmable ROM (EEPROM), or the flash memory. The volatile memory may include the random-access memory (RAM) or an external cache memory. By way of illustration and not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchronous chain Road (Synchlink) DRAM (SLDRAM), memory bus (Rambus) direct RAM (RDRAM), direct memory bus dynamic RAM (DRDRAM), and memory bus dynamic RAM (RDRAM) and the like.

The various technical features of the above-described embodiments may be combined arbitrarily. In order to make the description concise, all possible combinations of the various technical features in the above-described embodiments are not described. However, as long as the combination of these technical features does not have any contradiction, it should be regarded as the scope of the description in this disclosure.

The above-described embodiments only illustrate several embodiments of the disclosure in more specific and detailed, but the embodiments shall not be interpreted as a limitation to the scope of the disclosure. It should be pointed out that for those skilled in the art, without departing from the concept of the present disclosure, several modifications and improvements may be made, which shall all belong to the protection scope of the present application. Therefore, the protection scope of the present disclosure shall be subjected to the appended claims.

What is claimed is:

1. A method for processing speech noise reduction, comprising:

responsive to a distance between speech collection devices reaching a preset value, acquiring a noisy speech signal collected by each respective speech collection device and performing frequency division processing on the noisy speech signal to obtain a low-frequency band signal;

acquiring an amplitude spectrum and a phase spectrum of the low-frequency band signal;

acquiring a modulation domain signal corresponding to the amplitude spectrum, the modulation domain signal comprising a modulation domain amplitude spectrum, a modulation domain power spectrum and a modulation domain phase spectrum;

performing spectral subtraction to process the modulation domain amplitude spectrum or the modulation domain power spectrum to obtain a noise-reduced modulation domain amplitude spectrum, a smoothing over-subtraction factor in the spectral subtraction being obtained according to a posterior signal-to-noise ratio of the modulation domain and a smoothing factor;

compensating the modulation domain phase spectrum to obtain the compensated modulation domain phase spectrum; and obtaining a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

2. The method for processing speech noise reduction according to claim 1, further comprising:

performing frequency division on the noisy speech signal, to obtain a high-frequency band signal;

acquiring an amplitude spectrum and a phase spectrum of the high-frequency band signal;

using a transfer gain function to process the amplitude spectrum of the high-frequency band signal, to obtain the amplitude spectrum of a noise-reduced high-frequency band signal;

obtaining the noise-reduced high-frequency band signal based on the amplitude spectrum of the noise-reduced high-frequency band signal and the phase spectrum of the high-frequency band signal; the transfer gain function being obtained according to a power spectrum, a cross-power spectrum of the high-frequency band signal and an estimated noise cross-power spectrum; and synthesizing the noise-reduced high-frequency band signal and the noise-reduced low-frequency band signal to obtain the noise-reduced speech signal.

3. The method for processing speech noise reduction according to claim 1, wherein, in the performing spectral subtraction to process the modulation domain amplitude spectrum or the modulation domain power spectrum to obtain the noise-reduced modulation domain amplitude spectrum, the noise-reduced modulation domain amplitude spectrum is obtained based on the following formula:

$$|S(u, w, k)|^p = \begin{cases} |Y_{LF}(u, w, k)|^p - \alpha(k)|V(u, w, k)|^p, & |Y_{LF}(u, w, k)|^p \geq \alpha(k)|V(u, w, k)|^p \\ \beta|V(u, w, k)|^p, & others \end{cases};$$

$$\alpha(k) = \theta\alpha(k-1) + (1-\theta)\left(\alpha_0 - \frac{4}{15}SNR_{post}(u, w, k)\right);$$

wherein, u is a modulation frame variable; W is a discrete frequency variable; k is a modulation domain variable; |S(u, w, k)| is the noise-reduced modulation domain amplitude spectrum; p is a type of the spectral subtraction, p=1 indicates that a spectral subtraction of the modulation domain amplitude spectrum is adopted, while p=2 indicates that a spectral subtraction of the modulation domain power spectrum is adopted; if p=1, $|V(u, w, k)|^P$ is an estimated noise modulation domain amplitude spectrum, if p=2, $|V(u, w, k)|^P$ is an estimated noise modulation domain power spectrum; $\alpha(k)$ is a modulation domain smoothing over-subtraction factor; $|Y_{LF}(u, w, k)|^P$ is the modulation domain amplitude spectrum or power spectrum; $SNR_{post}(u, w, k)$ is the posterior signal-to-noise ratio of the modulation domain; $\theta$ is the smoothing factor; $\alpha_0$ is a constant.

4. The method for processing speech noise reduction according to claim 1, wherein the compensating the modulation domain phase spectrum to obtain the compensated modulation domain phase spectrum comprises:

performing conjugate angle modulation on the modulation domain phase spectrum by using an antisymmetric function and an estimated noise modulation domain amplitude spectrum, to obtain a phase compensation; or performing conjugate angle modulation on the modulation domain phase spectrum by using an antisymmetric function and an estimated noise modulation domain power spectrum, to obtain a phase compensation; and obtaining the compensated modulation domain phase spectrum according to the phase compensation and the modulation domain phase spectrum.

5. The method for processing speech noise reduction according to claim 4, wherein, in the performing conjugate angle modulation on the modulation domain phase spectrum by using the antisymmetric function and the estimated noise modulation domain amplitude spectrum to obtain the phase compensation, the phase compensation is obtained based on the following formula:

$$\Lambda(u, w, k) = \xi\varphi(k)|V(u, w, k)|^1;$$

wherein, u is a modulation frame variable; W is a discrete frequency variable; k is a modulation domain variable; $\Lambda(u, w, k)$ is the phase compensation; $\varphi(k)$ is the antisymmetric function; $\xi$ is a constant; $|V(u, w, k)|^1$ is the estimated noise modulation domain amplitude spectrum;

wherein, in the performing conjugate angle modulation on the modulation domain phase spectrum by using the antisymmetric function and the estimated noise modulation domain power spectrum to obtain the phase compensation, the phase compensation is obtained based on the following formula:

$$\Lambda(u, w, k) = \xi\varphi(k)|V(u, w, k)|^2;$$

wherein, u is the modulation frame variable; W is the discrete frequency variable; k is the modulation domain variable; $\Lambda(u, w, k)$ is the phase compensation; $\varphi(k)$ is the antisymmetric function; $\xi$ is a constant; $|V(u, w, k)|^2$ is the estimated noise modulation domain power spectrum;

wherein, in the obtaining the compensated modulation domain phase spectrum according to the phase compensation and the modulation domain phase spectrum, the compensated phase spectrum is obtained based on the following formula:

$$angle[S(u, w, k)] = angle[Y_{LF}(u, w, k)] + \Lambda(u, w, k);$$

wherein, angle[S(u, w, k)] is the compensated modulated domain phase spectrum; angle[$Y_{LF}$(u, w, k)] is the modulation domain phase spectrum.

6. The method for processing speech noise reduction according to claim 1, wherein, the obtaining the noise-reduced low-frequency band signal based on the compensated modulation domain phase spectrum, the noise-reduced modulation domain amplitude spectrum and the phase spectrum of the noise-reduced low-frequency band signal comprises:

performing inverse-Fourier transformation and overlap-add processing successively on the noise-reduced modulation domain amplitude spectrum and the compensated modulated domain phase spectrum, to obtain the amplitude spectrum of the noise-reduced the low-frequency band signal; and performing inverse-Fourier transformation and overlap-add processing successively on the amplitude spectrum of the noise-reduced low-frequency band signal and the phase spectrum of the low-frequency band signal, to obtain the noise-reduced low-frequency band signal.

7. The method for processing speech noise reduction according to claim 2, wherein, the obtaining the noise-reduced high-frequency band signal based on the amplitude spectrum of the noise-reduced high-frequency band signal and the phase spectrum of the high-frequency band signal comprises:
performing inverse-Fourier transformation and overlap-add processing on the amplitude spectrum of the high-frequency band signal and the amplitude spectrum of the noise-reduced high-frequency band signal, to obtain the noise-reduced high-frequency band signal.

8. The method for processing speech noise reduction according to claim 2, wherein, in the using the transfer gain function to process the amplitude spectrum of the high-frequency band signal to obtain the amplitude spectrum of the noise-reduced high-frequency band signal, the amplitude spectrum of the noise-reduced high-frequency band signal is obtained based on the following formula:

$$|S(u, w)| = |Y_{HF}(u, w)| H(u, w);$$

$$H(u, w) = \frac{|P_{Y_i Y_j}(u, w)| - |P_{V_i V_j}(u, w)|}{\sqrt{P_{Y_i Y_i}(u, w) P_{Y_j Y_j}(u, w)}};$$

$$|P_{V_i V_j}(u, w)| =$$

$$\sqrt{P_{V_i V_i}(u, w) P_{V_j V_j}(u, w)} = \varphi(\tilde{\gamma}(u, w)) \sqrt{P_{V_i V_i}(u-1, w) P_{V_j V_j}(u-1, w)};$$

$$\varphi(\tilde{\gamma}(u, w)) = b + \left(\frac{(1-b)}{1 + 1/(g \cdot \tilde{\gamma}(u, w))}\right)\left(1 + \frac{1}{1 + g \cdot h \cdot \tilde{\gamma}(u, w)}\right);$$

$$\tilde{\gamma}(u, w) = \frac{|Y_i(u, w) Y_j(u, w)|}{\sqrt{P_{V_i V_i}(u-1, w) P_{V_j V_j}(u-1, w)}};$$

wherein, |S(u, w)| is the amplitude spectrum of the noise-reduced high-frequency band signal; H(u, w) is the transfer gain function; $|Y_{HF}(u, w)|$ is the amplitude spectrum of a noisy speech high-frequency band signal; $|P_{Y_i Y_j}(u, w)|$ is the cross-power spectrum of the noisy speech high-frequency band signal; $|P_{V_i V_j}(u, w)|$ is the estimated cross-power spectrum of the high-frequency band noise; i and j are high-frequency band signals respectively collected by two speech collection devices; $\tilde{\gamma}(u, w)$ is a modified posterior signal-to-noise ratio; $\varphi(\tilde{\gamma}(u, w))$ is the transfer gain function; g, b, h are constants; $|Y_i(u, w) Y_j(u, w)|$ is a cross-amplitude spectrum of the high-frequency band signal.

9. The method for processing speech noise reduction according to claim 1, wherein, the acquiring the amplitude spectrum and the phase spectrum of the low-frequency band signal comprises:
preprocessing the low-frequency band signal, to obtain a stable low-frequency band signal; and
performing Fourier transform on the stable low-frequency band signal, to obtain the amplitude spectrum and the phase spectrum of the low-frequency band signal.

10. The method for processing speech noise reduction according to claim 9, wherein, the preprocessing the low-frequency band signal to obtain the stable low-frequency band signal comprises:
performing a framing process and a windowing process successively on the low-frequency band signal, to obtain the stable low-frequency band signal.

11. The method for processing speech noise reduction according to claim 2, wherein, acquiring the amplitude spectrum and the phase spectrum of the high-frequency band signal comprises:
preprocessing the high-frequency band signal, to obtain a stable high-frequency band signal; and
performing Fourier transform on the stable high-frequency band signal, to obtain the amplitude spectrum and the phase spectrum of the high-frequency band signal.

12. The method for processing speech noise reduction according to claim 11, wherein, the preprocessing the high-frequency band signal to obtain the stable high-frequency band signal comprises:
performing a framing process and a windowing process successively on the high-frequency band signal, to obtain the stable high-frequency band signal.

13. The method for processing speech noise reduction according to claim 1, wherein, the acquiring the modulation domain signal corresponding to the amplitude spectrum comprises:
performing Fourier transform on the amplitude spectrum, to obtain the modulation domain signal.

14. The method for processing speech noise reduction according to claim 2, wherein, the performing frequency division on the noisy speech signal to obtain the low-frequency band signal comprises:
performing convex-free low-pass filtering on the noisy speech signal, to obtain a low-frequency band signal;
the performing frequency division on the noisy speech signal to obtain the high-frequency band signal comprises:
performing convex-free high-pass filtering on the noisy speech signal, to obtain a high-frequency band signal.

15. A computer device comprising a memory and a processor, wherein the memory is stored with a computer program, and the processor is configured to perform the computer program to implement a method for processing speech noise reduction, wherein the method comprises:
responsive to a distance between speech collection devices reaching a preset value, acquiring a noisy speech signal collected by each respective speech collection device and performing frequency division processing on the noisy speech signal to obtain a low-frequency band signal;
acquiring an amplitude spectrum and a phase spectrum of the low-frequency band signal;
acquiring a modulation domain signal corresponding to the amplitude spectrum, the modulation domain signal comprising a modulation domain amplitude spectrum, a modulation domain power spectrum and a modulation domain phase spectrum;
performing spectral subtraction to process the modulation domain amplitude spectrum or the modulation domain power spectrum to obtain a noise-reduced modulation domain amplitude spectrum, a smoothing over-subtraction factor in the spectral subtraction being obtained according to a posterior signal-to-noise ratio of a modulation domain and a smoothing factor;
compensating the modulation domain phase spectrum to obtain the compensated modulation domain phase spectrum; and
obtaining a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

16. The computer device according to claim 15, wherein, the method further comprises:
performing frequency division on the noisy speech signal, to obtain a high-frequency band signal;
acquiring an amplitude spectrum and a phase spectrum of the high-frequency band signal;
using a transfer gain function to process the amplitude spectrum of the high-frequency band signal, to obtain the amplitude spectrum of a noise-reduced high-frequency band signal; obtaining a noise-reduced high-frequency band signal based on the amplitude spectrum of the noise-reduced high-frequency band signal and the phase spectrum of the high-frequency band signal; the transfer gain function being obtained according to the power spectrum, a cross-power spectrum of the high-frequency band signal and an estimated noise cross-power spectrum; and
synthesizing the noise-reduced high-frequency band signal and the noise-reduced low-frequency band signal to obtain the noise-reduced speech signal.

17. The computer device according to claim 15, wherein, in the performing spectral subtraction to process the modulation domain amplitude spectrum or the modulation domain power spectrum to obtain the noise-reduced modulation domain amplitude spectrum, the noise-reduced modulation domain amplitude spectrum is obtained based on the following formula:

$$|S(u, w, k)|^p = \begin{cases} |Y_{LF}(u, w, k)|^p - \alpha(k)|V(u, w, k)|^p, & |Y_{LF}(u, w, k)|^p \geq \alpha(k)|V(u, w, k)|^p \\ \beta|V(u, w, k)|^p, & \text{others} \end{cases};$$

$$\alpha(k) = \theta\alpha(k-1) + (1-\theta)\left(\alpha_0 - \frac{4}{15}SNR_{post}(u, w, k)\right);$$

wherein, u is a modulation frame variable; W is a discrete frequency variable; k is a modulation domain variable; |S(u, w, k)| is the noise-reduced modulation domain amplitude spectrum; p is a type of the spectral subtraction, p=1 indicates that a spectral subtraction of the modulation domain amplitude spectrum is adopted, while p=2 indicates that a spectral subtraction of the modulation domain power spectrum is adopted; if p=1, |V(u, w, k)|$^P$ is an estimated noise modulation domain amplitude spectrum, if p=2, |V(u, w, k)|$^P$ is an estimated noise modulation domain power spectrum; α(k) is a modulation domain smoothing over-subtraction factor; Y$_{LF}$(u, w, k)|$^P$ is the modulation domain amplitude spectrum or power spectrum; SNR$_{post}$(u, w, k) is the posterior signal-to-noise ratio of the modulation domain; θ is a smoothing factor; α$_0$ is a constant.

18. A non-transitory computer-readable storage medium storing a computer program, which is executable by a processor to implement a method for processing speech noise reduction, wherein the method comprises:
responsive to a distance between speech collection devices reaching a preset value, acquiring a noisy speech signal collected by each respective speech collection device and performing frequency division processing on the noisy speech signal to obtain a low-frequency band signal;
acquiring an amplitude spectrum and a phase spectrum of the low-frequency band signal;
acquiring a modulation domain signal corresponding to the amplitude spectrum, the modulation domain signal comprising a modulation domain amplitude spectrum, a modulation domain power spectrum and a modulation domain phase spectrum;
performing spectral subtraction to process the modulation domain amplitude spectrum or the modulation domain power spectrum to obtain a noise-reduced modulation domain amplitude spectrum, a smoothing over-subtraction factor in the spectral subtraction being obtained according to a posterior signal-to-noise ratio of a modulation domain and a smoothing factor;
compensating the modulation domain phase spectrum to obtain the compensated modulation domain phase spectrum; and
obtaining a noise-reduced low-frequency band signal based on the compensated modulation domain phase spectrum, the noise-reduced modulation domain amplitude spectrum and the phase spectrum of the low-frequency band signal; the noise-reduced low-frequency band signal being configured to synthesize a noise-reduced speech signal.

19. The non-transitory computer-readable storage medium according to claim 18, wherein, the method further comprises:
performing frequency division on the noisy speech signal, to obtain a high-frequency band signal;
acquiring an amplitude spectrum and a phase spectrum of the high-frequency band signal;
using a transfer gain function to process the amplitude spectrum of the high-frequency band signal, to obtain the amplitude spectrum of a noise-reduced high-frequency band signal;
obtaining the noise-reduced high-frequency band signal based on the amplitude spectrum of the noise-reduced high-frequency band signal and the phase spectrum of the high-frequency band signal; the transfer gain function being obtained according to a power spectrum, a cross-power spectrum of the high-frequency band signal and an estimated noise cross-power spectrum; and
synthesizing the noise-reduced high-frequency band signal and the noise-reduced low-frequency band signal to obtain the noise-reduced speech signal.

20. The non-transitory computer-readable storage medium according to claim 18, wherein, in the performing spectral subtraction to process the modulation domain amplitude spectrum or the modulation domain power spectrum to obtain the noise-reduced modulation domain amplitude spectrum, the noise-reduced modulation domain amplitude spectrum is obtained based on the following formula:

$$|S(u, w, k)|^p = \begin{cases} |Y_{LF}(u, w, k)|^p - \alpha(k)|V(u, w, k)|^p, & |Y_{LF}(u, w, k)|^p \geq \alpha(k)|V(u, w, k)|^p \\ \beta|V(u, w, k)|^p, & \text{others} \end{cases};$$

$$\alpha(k) = \theta\alpha(k-1) + (1-\theta)\left(\alpha_0 - \frac{4}{15}SNR_{post}(u, w, k)\right);$$

wherein, u is a modulation frame variable; W is a discrete frequency variable; k is a modulation domain variable; |S(u, w, k)| is the noise-reduced modulation domain amplitude spectrum; p is a type of the spectral subtraction, p=1 indicates that a spectral subtraction of the modulation domain amplitude spectrum is adopted, while p=2 indicates that a spectral subtraction of the modulation domain power spectrum is adopted; if p=1, $|V(u, w, k)|^P$ is an estimated noise modulation domain amplitude spectrum, if p=2, $|V(u, w, k)|^P$ is an estimated noise modulation domain power spectrum; $\alpha(k)$ is a modulation domain smoothing over-subtraction factor; $|Y_{LF}(u, w, k)|^P$ is the modulation domain amplitude spectrum or power spectrum; $SNR_{post}(u, w, k)$ is the posterior signal-to-noise ratio of the modulation domain; $\theta$ is the smoothing factor; $\alpha_0$ is a constant.

* * * * *